United States Patent
Sypeck (10) Patent No.: US 9,845,600 B2
(45) Date of Patent: Dec. 19, 2017

(54) HIGHLY VENTED TRUSS WALL HONEYCOMB STRUCTURES

(75) Inventor: David J. Sypeck, Palm Coast, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 973 days.

(21) Appl. No.: 13/537,252

(22) Filed: Jun. 29, 2012

(65) Prior Publication Data
US 2013/0000247 A1    Jan. 3, 2013

Related U.S. Application Data

(60) Provisional application No. 61/503,982, filed on Jul. 1, 2011.

(51) Int. Cl.
| | |
|---|---|
| *B32B 3/12* | (2006.01) |
| *B21D 47/00* | (2006.01) |
| *E04C 2/36* | (2006.01) |
| *B32B 3/26* | (2006.01) |
| *B32B 5/02* | (2006.01) |
| *B33Y 80/00* | (2015.01) |

(52) U.S. Cl.
CPC .............. *E04C 2/365* (2013.01); *B21D 47/00* (2013.01); *B32B 3/12* (2013.01); *B32B 3/26* (2013.01); *B32B 3/266* (2013.01); *B32B 5/028* (2013.01); *B33Y 80/00* (2014.12); *Y10T 29/49625* (2015.01)

(58) Field of Classification Search
None
See application file for complete search history.

(56) References Cited

U.S. PATENT DOCUMENTS

| 3,673,058 A * | 6/1972 | Jackson | E04C 2/36 |
| | | | 428/118 |
| 4,882,130 A | 11/1989 | Asai et al. | |
| 5,714,226 A | 2/1998 | Disselbeck | |
| 5,923,003 A | 7/1999 | Arcas et al. | |
| 5,958,549 A | 9/1999 | Jaegers et al. | |
| 6,908,661 B2 | 6/2005 | Green et al. | |
| 7,566,487 B2 | 7/2009 | Feinstein | |
| 7,718,246 B2 | 5/2010 | Strauss | |
| 2005/0202206 A1 | 9/2005 | Wadley et al. | |

(Continued)

OTHER PUBLICATIONS

Ajdari et al., Dynamic Crushing and Energy Absorption of Regular, Irregular and Functionally Graded Cellular Structures, 48 Int'l J. Solids and Structures 506 (2011).*

(Continued)

*Primary Examiner* — Humera Sheikh
*Assistant Examiner* — Nicholas W Jordan
(74) *Attorney, Agent, or Firm* — Womble Carlyle Sandridge & Rice, LLP (57) ABSTRACT

A vented honeycomb structure with a plurality of honeycomb cells arranged in a hierarchical order and having a plurality of truss walls, each truss wall including a plurality of members. The vented honeycomb structure is fabricated by joining a plurality of sheets of trusses using any one of an expansion, a corrugation, and a slotting process. Fabrication can also occur by deposition, casting, additive, extrusion, or aligning and joining methods. The honeycomb cells, truss walls, truss wall openings, and truss wall members can be functionally graded.

21 Claims, 6 Drawing Sheets

(56) References Cited

U.S. PATENT DOCUMENTS

| | | | |
|---|---|---|---|
| 2008/0032085 A1* | 2/2008 | Hendriksen | B29C 73/10 |
| | | | 428/63 |
| 2008/0044621 A1* | 2/2008 | Strauss | B22F 3/1115 |
| | | | 428/116 |
| 2011/0129640 A1 | 6/2011 | Beall et al. | |
| 2011/0262692 A1 | 10/2011 | Oyama | |
| 2012/0021165 A1* | 1/2012 | Hethcock | B32B 3/12 |
| | | | 428/107 |
| 2012/0125726 A1* | 5/2012 | Langhorst | F16F 7/121 |
| | | | 188/266 |

OTHER PUBLICATIONS

"Argosy Vented Aluminum Honeycomb," accessed Jan. 3, 2012, Argosy International, Inc., http:/www.argosyinternational.com/datasheet/Argosy%20Vented%20Aluminum%20Core.pdf.

Wadley, Haydn N.G., "Multifunctional Periodic Cellular Metals," Phil. Trans. R. Soc. A, 2006, 31-68, 364, The Royal Society.

Tincher, Benjamin, "Study of Aluminum Honeycomb Structures using Finite Element Analysis," accessed Jan. 3, 2012, 22-25, http://issuu.com/benjamin.tincher/doc/aluminum.honeycomb.

Epstein et al., "Honeycomb Sandwich Structures: Vented Versus Unvented Designs for Space Systems," Aerospace Report No. TR-93(3904)-1, Oct. 1993, The Aerospace Corporation, El Segundo, CA.

Sypeck, D.J., "Fabrication and Crushing Behavior of Highly Vented Honeycomb Structures," International Conference on Composites/Nano Engineering, 2010, Anchorage, Alaska.

\* cited by examiner

HIGHLY VENTED TRUSS WALL HONEYCOMB STRUCTURES

CROSS-REFERENCE TO RELATED APPLICATION

This application claims the benefit of U.S. Provisional Patent Application Ser. No. 61/503,982, filed on Jul. 1, 2011. The specification and drawings of the provisional patent application are specifically incorporated by reference herein.

TECHNICAL FIELD

Embodiments of the invention generally relate to improved structural/multifunctional material designs and methods for fabricating them. More particularly, the embodiments relate to the use of trusses for the walls of honeycombs and lightweight structures fabricated from them.

BACKGROUND OF THE INVENTION

A truss is a framework of members fastened together at their ends to support loads. A plane truss has all members lying in a single geometric plane whereas a space truss has members lying in three-dimensions. Truss members are typically long, straight, slender, and have constant cross-section. They can be fastened by welding, riveting, bolting (often gusset plates are used), or other means. Members support load by tension/compression only for maximum structural efficiency (bending is not as efficient). These robust types of structures provide greater stiffness, strength, and damage tolerance over other structural choices at lower weight and cost, are relatively straightforward to analyze, design, and fabricate, while their exposed interior provides much open space for other functionalities. Skyscraper framing, bridges, roof supports, transmission line towers, radio antennas, etc. are all commonly made from trusses. Classic examples include the Eiffel Tower and cellular geodesic domes.

Honeycombs are cellular solids made from a collection of thin wall open prismatic cells nested together to fill a plane. Exceptionally stiff and strong for their weight, they can also be multifunctional and do much more than just support loads. Aerospace (e.g., aircraft, rockets, spacecraft, etc.) and other industries widely benefit from this form of construction where weight savings is crucial. Some of the many honeycomb applications include sandwich structure cores, impact energy absorbers, flow aligners, filters, insulating panels, radio frequency shields, sound barriers, catalyst support medium, heat exchangers, and acoustic dampeners.

When facing skins are attached to conventional honeycomb cores, the fabrication environment (e.g., humid air, volatile organic compounds, etc.) is trapped within. In space applications, pressure differential between the core and ambient during ascent can lead to mission catastrophic failure. In the near vacuum of space, core release can contaminate sensitive equipment. With time and exposure, the service environment (e.g., humid air) can also be trapped through ingress and diffusion. Aircraft control surfaces, helicopter rotor blades, etc., are all susceptible to moisture accumulation which adds weight, degrades adhesives, accelerates corrosion, steams/freezes, etc. Pressurization/depressurization and heating/cooling cycles (e.g., ground-air-ground) exacerbate the issue. A simple "tap" test sometimes exposes the "dead zones." One way to repair a wet honeycomb core involves introducing holes into the facing skins, puncturing the cell walls, heating to remove the moisture, and then patching. However, damage caused by the moisture largely remains, steam pressure buildup during heating or patching weakens the panels, the paths for moisture ingress are not resolved, and the problem is likely to repeat. One can fabricate the honeycomb with porous, perforated, slotted, or drilled walls (or facing skins), and/or offset honeycomb layers, but most of these "breathable" versions have limited fluid throughput and cost more. Furthermore, holes or other alterations tend to concentrate stress and structural integrity may suffer.

SUMMARY

In exemplary embodiments disclosed herein, honeycomb structures include truss walls. The trusses can include structures that are solid, hollow, porous, or combinations thereof. The trusses can be fabricated from various materials and combinations thereof. The cross-sectional shapes of the trusses can include hexagonal, triangular, square, rectangular, circular, elliptical, and other shapes and combinations thereof. Truss wall openings can include hexagonal, triangular, square, rectangular, circular, elliptical, angular, and other shapes and combinations thereof. Honeycomb cell shapes can include hexagonal, triangular, square, rectangular, circular, elliptical, angular, and other shapes and combinations thereof. The honeycomb cells, truss wall openings, truss wall members, and/or truss walls can be functionally graded. The honeycomb structure can be flat, tapered, curved, or combinations thereof, and have one or more perimeter-oriented facing skins.

In one embodiment, a vented honeycomb structure includes a plurality of honeycomb cells arranged in a hierarchical order and having a plurality of truss walls, each truss wall including a plurality of members. The honeycomb cells, the truss wall openings, the truss wall members, and the truss walls can be functionally graded in some embodiments.

In one embodiment, a method is provided for fabricating a vented truss wall honeycomb structure having a plurality of honeycomb cells arranged in a hierarchical order and having a plurality of truss walls, each truss wall including a plurality of members and a plurality of truss wall openings. A plurality of sheets of trusses is provided and the honeycomb structure is formed by joining the plurality of sheets using any one of an expansion, a corrugation, and a slotting process. Fabrication can also occur by deposition, casting, additive, extrusion, or aligning and joining methods in some embodiments. The honeycomb cells, the truss wall openings, the truss wall members, and the truss walls can be functionally graded in some embodiments.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Many honeycomb structures have their honeycomb core bonded to facings (skins). Unvented honeycomb sandwich structures use an unvented core so that there is no air transfer from cell to cell and there is no venting to the exterior of the panel. A perforated honeycomb core alone may not provide a vented structure unless the panel provides exterior venting as well. Partially vented honeycomb structures provide some venting but not enough to accommodate pressure differentials between internal and exterior surfaces.

Vented honeycomb structures can use perforated, slotted, or porous honeycomb cores through which air can flow freely from cell to cell at a rate corresponding to a pressure drop between internal and exterior surfaces. In exemplary embodiments, many porous sheet types, joining methods, and wall/cell geometries are possible for fabricating such a structure. Venting to the exterior is provided either through the skin or panel edge members.

Mechanical properties are influenced by the base material and its distribution, imperfections, and defects. The most weight efficient structures favor structural hierarchy, i.e., elements/members which themselves have structure. Cancellous bone, fibrous composites, and the Eiffel tower are all examples of hierarchical structures. When deformation is dominated by substructure bending, neither relative stiffness nor strength benefit from structural hierarchy. Closed and open cell foams undergo mechanical properties knockdown (these mechanical properties scale much less than linearly with density) because of this. With foaming, control over the distribution of cell size and wall/ligament geometry is inherently difficult. However, when elements/members are favorably oriented (e.g., space truss), and/or flat and straight (e.g., honeycomb), mechanical properties can scale linearly with density. Furthermore, the first few levels of hierarchical order (i.e., number of levels of scale with recognized structure) can yield dramatic strength to weight improvements. Many short elements/members resist buckling better than a few long members. Many short members also improve safety though structural redundancy, although weight specific stiffness remains largely unchanged.

The ability to organize, characterize and manipulate matter systematically at a small scale is a worthwhile endeavor but requires effort and resources. Frequently, compromises are made by joining relatively small amounts of stochastic matter in an organized way. For example, honeycomb cell walls can be made from a stochastic arrangement of matter, e.g., metal grains or aramid paper fibers, although the cell geometries themselves are highly organized. Other successful examples include fibrous composites and structural sandwich panels. With hierarchy, simple and affordable processes are sought. Functional grading characterized by gradual compositional or structural variations over the volume leads to gradually changing properties of the material.

Figure 1A:
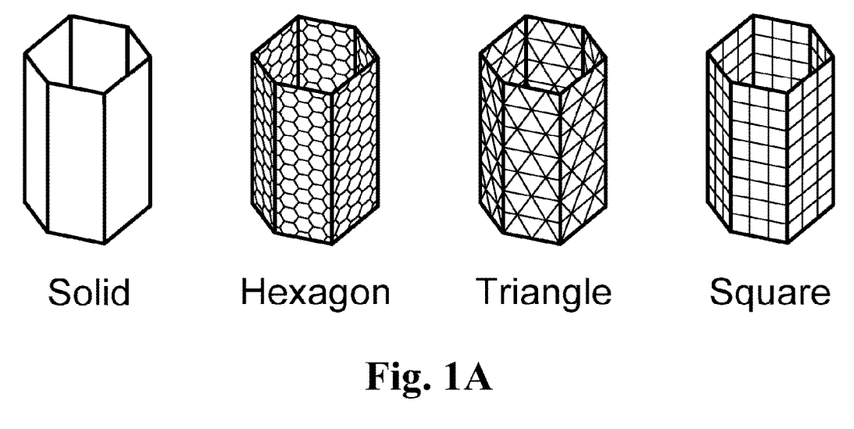
FIG. 1A illustrates solid wall and exemplary truss wall honeycomb structures.
Figure 1B:
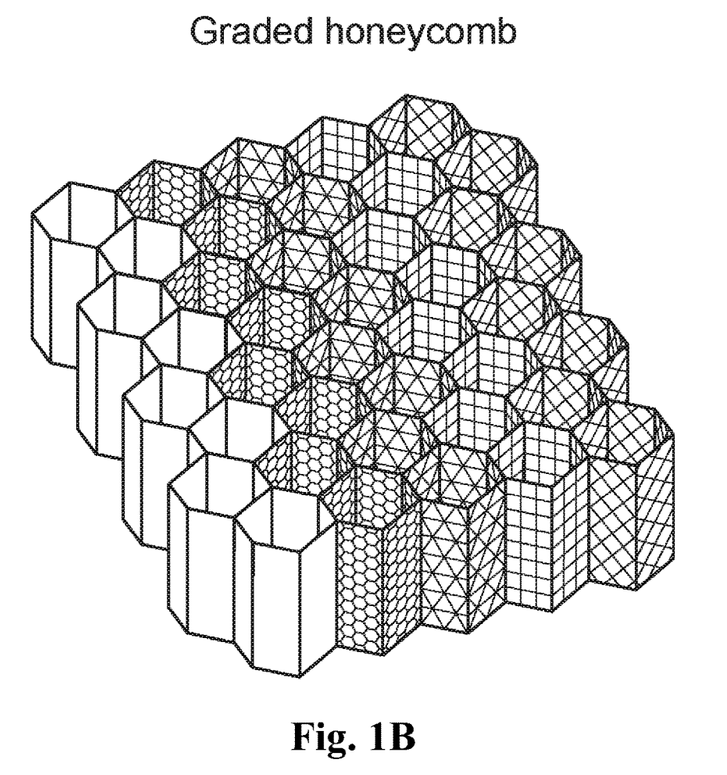
FIG. 1B illustrates a graded truss wall honeycomb structure in an exemplary embodiment.
Figure 2:
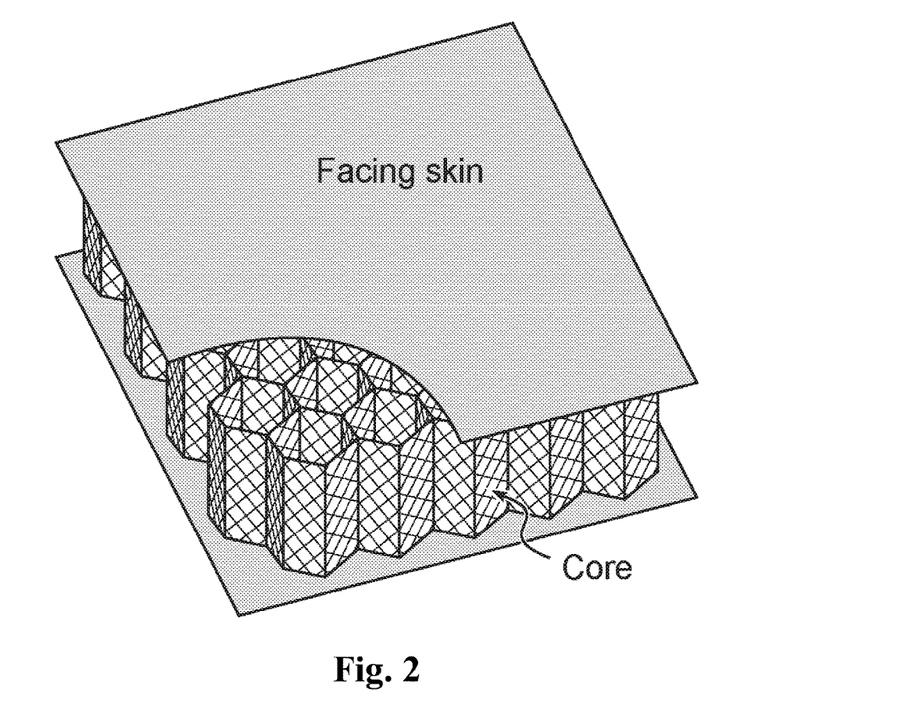
FIG. 2 illustrates a sandwich structure with a bias (±45°) oriented truss wall honeycomb core in an exemplary embodiment.
Figure 3:
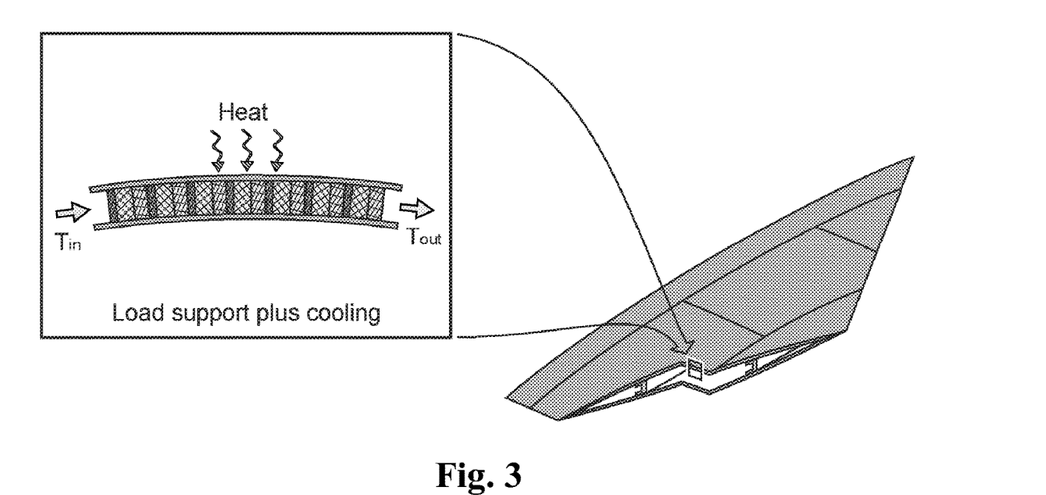
FIG. 3 illustrates a multifunctional sandwich structure providing load support plus cooling in an exemplary embodiment.
Figure 4:
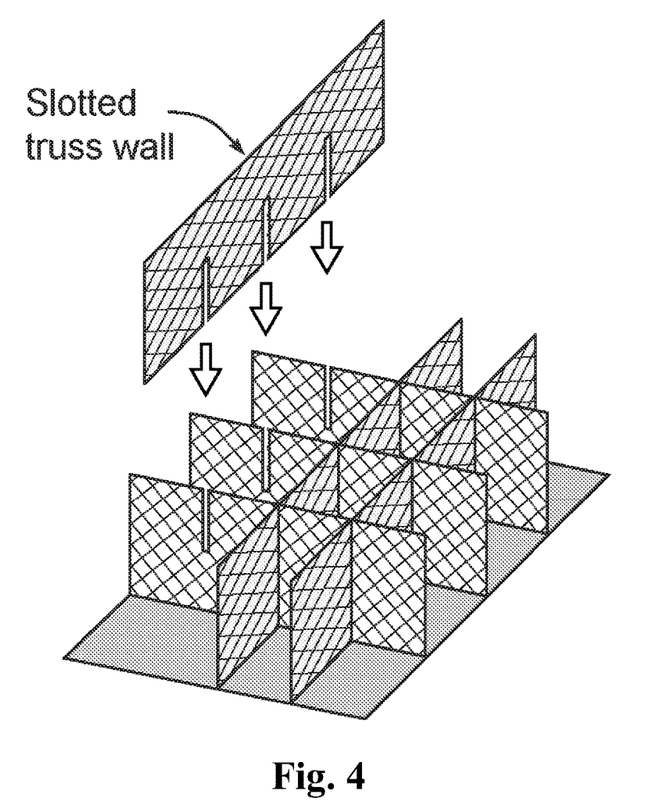
FIG. 4 illustrates a process for fabricating honeycomb cores from slotted truss sheets in accordance with an exemplary embodiment.

Hierarchical truss concepts can extend to highly vented honeycomb structures, such as those illustrated in FIG. 1, with added functionality such as space for fuel storage, coolant flow, wiring and piping, etc. In exemplary embodiments, efficient trusses are used for the walls of efficient honeycombs. The trusses can be, but are not limited to, solid, hollow, porous, or combinations thereof. The trusses can be fabricated from, but are not limited to, a natural material, metal, ceramic, polymer, elastomer, glass, paper, composite, semiconductor, or combinations thereof. The cross-sectional shapes of the trusses can be, but are not limited to, hexagonal, triangular, square, rectangular, circular, elliptical, angular, I-beam, Z-section, C-section, H-section, T-section, L-section, hat-section, other shapes, or combinations thereof. Truss wall openings can be, but are not limited to, hexagonal, triangular, square, rectangular, circular, elliptical, other shapes, or combinations thereof. Honeycomb cell shapes can be, but are not limited to, hexagonal, triangular, square, rectangular, circular, elliptical, other shapes, or combinations thereof. FIG. 1A depicts truss wall honeycomb cell shapes that are hexagonal, with truss wall openings that are hexagonal, triangular, and square (or diamond). In exemplary embodiments, honeycomb cells, truss wall openings, truss wall members, and/or truss walls can be functionally graded, i.e., composition and structure varying gradually over volume resulting in changes in the properties of the material. FIG. 1B illustrates a graded honeycomb structure. The honeycomb structure can be flat, tapered, curved, or combinations thereof, and have one or more perimeter-oriented facing skins. FIG. 2 illustrates facing skins on a hexagonal cell core structure. The sandwich structure depicted includes bias (±45°) oriented truss walls. Truss wall honeycombs can be made by expansion, corrugation, or slotting processes; by sacrificial or retained template deposition processes, by casting, by additive methods, by extrusion, or by aligning and joining methods. FIG. 3 illustrates a multifunctional sandwich structure providing load support plus cooling. FIG. 4 illustrates a process for fabricating honeycomb cores from slotted truss sheets.

One approach for providing sheets of trusses is based upon a recognition that high structural quality porous objects have already been made for many years by taking filaments (e.g., wrought metal wires) and weaving, braiding, or knitting them. Woven fiberglass cloth, braided metal cables, and knitted polyester garments are good examples. The textile approaches used to create such articles are very well established and affordable. Furthermore, a host of base material choices are available along with a wide variety of filament arrangements and mixes. Conventional textiles become rigid sheets of trusses when their filament contacts are appropriately bonded (similar to fastening the members of a truss). Straight, slender filaments are desired.

In one embodiment, plain square mesh woven wire cloth of type 304 stainless steel with 0.17 mm (0.0065 in) diameter wires and having 11.8 mesh/cm (30 mesh/in) was bias cut, cleaned, and then lightly sprayed with a mix of −140 mesh Nicrobraz® 51 brazing filler metal (composition: Ni-25Cr-10P wt. %) and Nicrobraz® Cement 520, both available from Wall Colmonoy Corporation (Madison Heights, Mich.). Strips were heated (ramp at 15° C./min; hold at 550° C. for one hour with an argon (Ar) purge to volatilize the cement; hold at 1100° C. for one hour in vacuum to braze) in a Ti gettered vacuum furnace (6 in diameter quartz tube; diffusion pumping system with liquid nitrogen trap; vacuum capability <$10^{-6}$ Torr). By bonding the wire contacts, rigid sheets of miniature trusses are made. After cooling, the strips were corrugated, sprayed, stacked, and brazed again.

Figure 5:
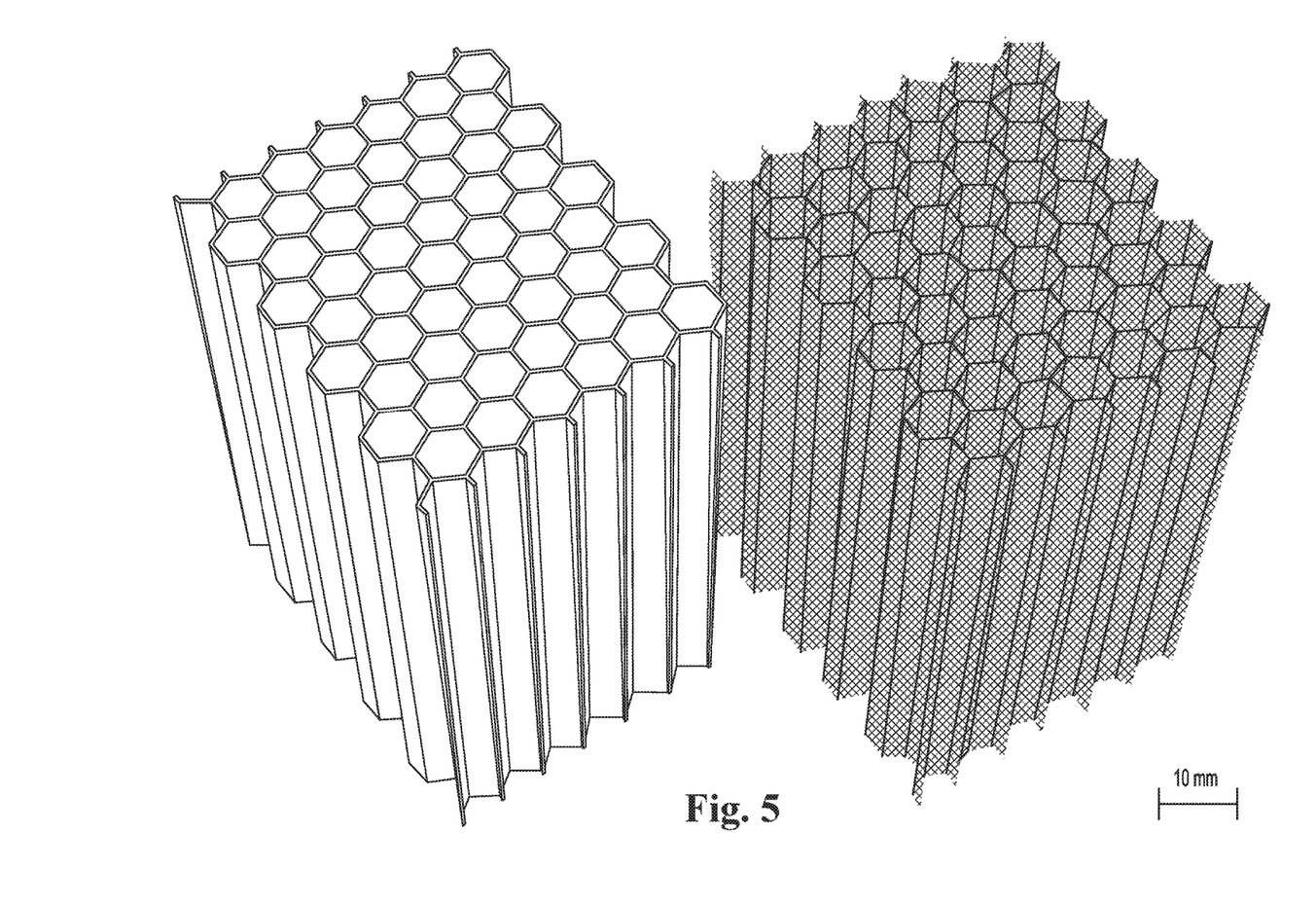
FIG. 5 illustrates test samples for solid wall and exemplary truss wall honeycomb structures.

As illustrated in FIG. 5, the test sample had 6.4 mm (0.25 in) cells, was 51.2 mm×45.2 mm×76.5 mm (thick) with 31.5 g mass (0.178 g/cm$^3$ or 11.1 pcf). With 7.9 g/cm$^3$ for type 304 stainless steel, the relative density was approximately 2.3%. Commercial expansion process honeycomb made from 0.064 mm (0.0025 in) thick aluminum alloy foil with 6.4 mm (0.25 in) cells offered comparison. The test sample was 54.9 mm×43.0 mm×76.3 mm (thick) with 12.9 g mass (0.0716 g/cm$^3$ or 4.5 pcf). With 2.7 g/cm$^3$ for aluminum alloys, the relative density was approximately 2.7%.

Figure 6:
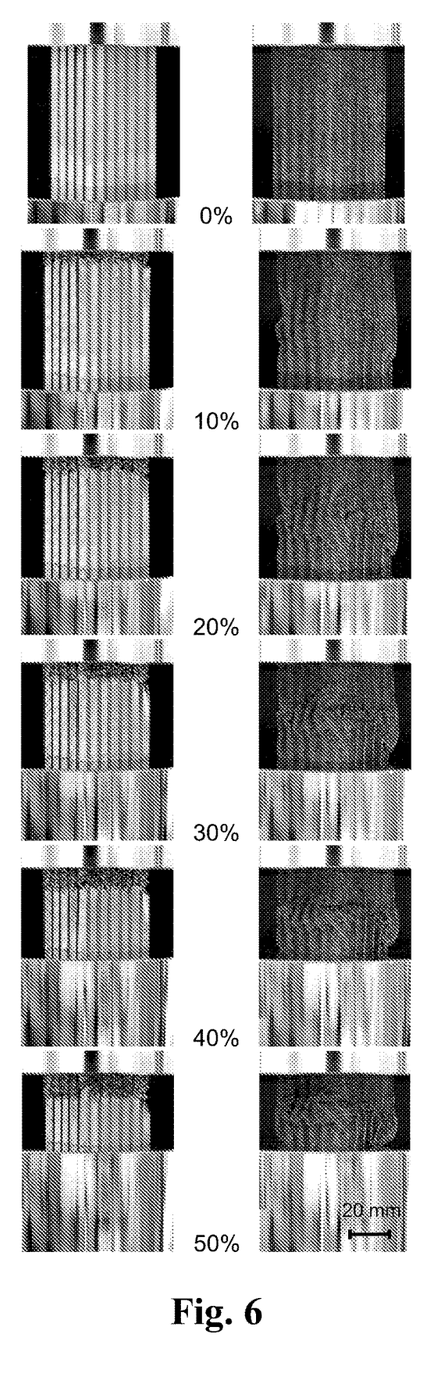
FIG. 6 illustrates the crushing behavior for solid wall and exemplary truss wall honeycomb structures.

An Instron Corporation (Norwood, Mass.) 8802 test system equipped with a ±25 kN load cell, flat compression platens, and FastTrack™ 8800 digital control/acquisition was used for testing. Samples were pre-loaded to 45 N (ASTM D 7336/D 7336M-07), then crushed at 5 min/min. Photographs and load-actuator displacement (converted to stress-strain), illustrated in FIGS. 6 and 7, respectively, were digitally recorded. The bare compressive strength for the solid wall honeycomb was 4.83 MPa at 0.57%, crush strength was approximately 1.7 MPa, and the absorbed energy at 75% stroke was 1.30 J/cm$^3$ or 18.2 J/g. For the truss wall honeycomb, compressive strength was 1.20 MPa at 4.21%, crush strength was approximately 1.1 MPa, and absorbed energy was 0.84 J/cm$^3$ or 4.7 J/g.

Figure 7:
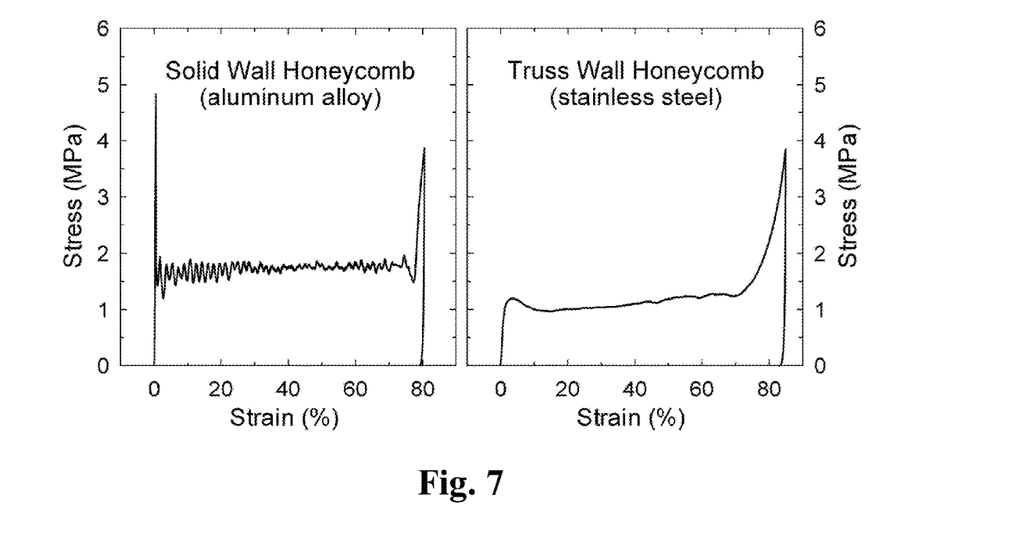
FIG. 7 illustrates stress-strain behavior for crushed solid wall and exemplary truss wall honeycomb structures.
Figure 8:
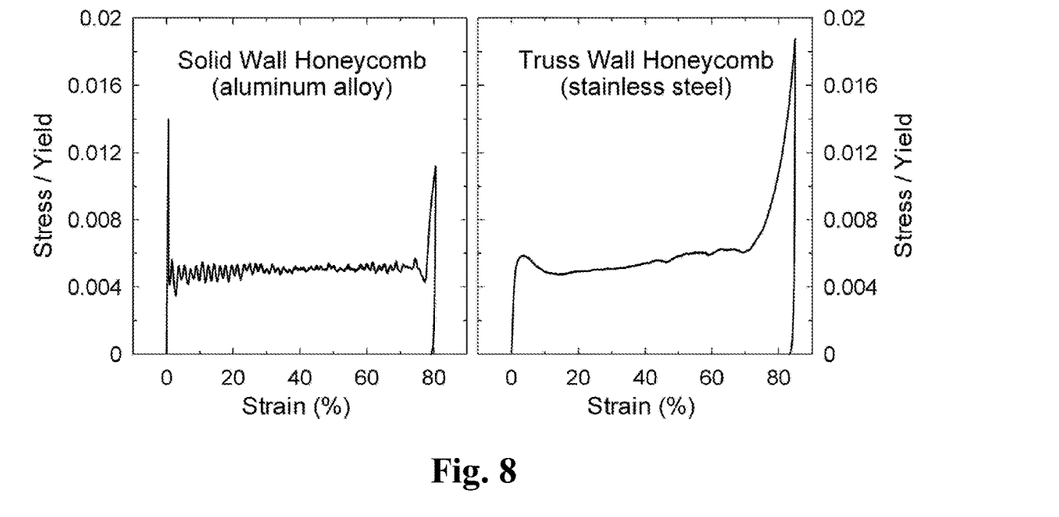
FIG. 8 illustrates the normalized (stress/yield) stress-strain behavior for crushed solid wall and exemplary truss wall honeycomb structures.

Plastic buckling collapse stress scales with parent alloy yield strength. Annealed type 304 stainless steel yields at 205 MPa which is somewhat less than extra hard honeycomb foils like aluminum alloy 5052-H39 or aluminum alloy 5056-H39 (e.g., values for the reported H38 temper are 255 MPa and 345 MPa, respectively). Tensile tests conducted on aluminum alloy foils extracted from the commercial honeycomb confirmed a yield strength near the upper end of this range. FIG. 7 illustrates stress-strain behavior for crushed sold wall and truss wall honeycomb structures. Dividing stress by parent alloy yield strength reveals very similar normalized crushing performance. FIG. 8 illustrates the normalized (stress/yield) stress-strain behavior for crushed solid wall and exemplary truss wall honeycomb structures. Additionally, the truss wall honeycomb exhibited a smoother crushing response with little initial peak stress (commercial energy absorbing honeycombs are commonly pre-crushed prior to field). The truss wall honeycomb is highly vented having much interconnected porosity, and its walls can be tailored. For example, bias oriented trusses resist shear for a good sandwich core. FIG. 2 illustrates a sandwich structure with a bias (±45°) oriented truss wall honeycomb core.

Another embodiment for providing sheets of trusses involves making holes in thin solid sheets. This can be done in a variety of ways including drilling, punching, perforating, laser or water jet cutting, chemical etching, etc. Other methods such as deposition, casting, rapid prototyping, powder sintering, extrusion, etc., can also work. Sheets of micro tubing can be used to create hollow trusses for improved efficiency and application. Expansion methods (e.g., expanded metals) are particularly attractive because unlike punching, base material is not lost to keep costs down. The process involves precision shearing of a solid sheet in such a way that causes the material to slit and stretch, leaving diamond shaped voids surrounded by interconnected strands of material (i.e., plane truss members). Paper can also be expanded but does not always remain stretched.

Brazing coil (#22-F 6951-F/4343) comprising precipitation hardenable aluminum alloy 6951 clad on both sides (approximately 10% thickness per side) with flux brazing aluminum alloy 4343 was obtained from Lynch Metals Incorporated (Union, N.J.). The material was 0.152 mm (0.006 in) thick and has a recommended flux brazing range of 593-616° C. Portions of the brazing coil were referred to Dexmet Corporation (Wallingford, Conn.) for precision micro expansion (a process that works for most metals and polymers). Dexmet fabricated MicroGrid® 6 Al 12-125 where 6 is original coil thickness (0.006 in), Al is aluminum, 12 is strand width (0.012 in), and 125 (0.125 in) is LWD dimension. The micro expanded material had 0.0625 in for SWD dimension, was 0.0120 in thick, had strands with nearly rectangular cross-section (0.012 in by 0.006 in), and 0.102 g/in$^2$ mass per area. This equates to 0.519 g/cm$^3$ by volume. Post flattening nearly doubled the density by compressing to almost the original coil thickness. It should be noted that strands having a square cross-section whose length is just short enough to avoid a buckling failure (yielding failure is preferred instead) are favored for making even lighter, more efficient truss structures.

To fabricate a truss wall honeycomb structure, a micro expanded brazing coil is corrugated (this also flattens), cleaned, stacked/aligned, and then salt bath dip brazed using molten Alu-Braze 860® (available from Heatbath Corporation, Indian Orchard, Mass.). Dip brazing occurs at about 600° C. for a short time, followed by draining, cooling, and cleaning. The resulting bonded truss wall honeycomb structure has large amounts of open, interconnected wall porosity and density of about 0.06 g/cm$^3$. With 2.7 g/cm$^3$ for aluminum alloys, relative density is approximately 2%. Polymer base adhesives and appropriate surface pretreatments like those used for bonding honeycomb foils also work, however, polymers become brittle when cold, soft when hot. Metallurgical bonding increases the temperature range capability. Vacuum or controlled atmosphere brazing provides another metallurgical option. Soldering, welding, diffusion bonding, chemical welding, and pressing can also work.

In other embodiments, a honeycomb truss can be fabricated by deposition onto a sacrificial or retained truss wall honeycomb template (e.g., electroless nickel plating), by casting material into molds with truss wall honeycomb shaped cavities, by additive fabrication such as powder sintering or rapid prototyping, by extrusion, or by aligning and joining methods. Deposition onto sacrificial templates is one way to produce truss members that are hollow.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A vented honeycomb structure, comprising:
a plurality of honeycomb cells arranged in an abutting relationship, wherein each of the plurality of honeycomb cells includes a series of truss walls connected together so that the honeycomb cells are defined as having a hexagonal, triangular, square, rectangular, circular, or elliptical shape, or any combination thereof,
wherein a set of truss walls of the series of truss walls comprises a plurality of trusses arranged to define a series of openings such that the truss walls are sufficiently porous to enable fluid flow therethrough and between at least a selected series of abutting honeycomb cells,
wherein each of the plurality of trusses includes a cross-section comprising at least one of a hexagonal, a triangular, a square, a rectangular, a circular, an elliptical, an angular, an I-beam, a Z-section, a C-section, a H-section, a T-section, a L-section, or a hat-section shape, or any combination thereof, and
wherein select ones of the series of openings defined by the plurality of trusses and select ones of the cross-sections of the plurality of trusses are functionally graded to vary compositional and/or structural properties of the plurality of honeycomb cells across a volume of the vented honeycomb structure.

2. The vented honeycomb structure of claim 1, wherein the series of truss walls are configured to provide an increase in strength as well as a reduction in density of the honeycomb structure.

3. The vented honeycomb structure of claim 1, wherein one or more of the series of truss walls comprise substantially solid walls.

4. The vented honeycomb structure of claim 1, wherein the plurality of trusses are at least one of solid, hollow, or porous.

5. The vented honeycomb structure of claim 1, wherein the plurality of trusses comprise a metal, a ceramic, a polymer, an elastomer, a glass, a paper, a composite, a semiconductor, or any combination thereof.

6. The vented honeycomb structure of claim 1, wherein the series of openings comprise a hexagonal, triangular, square, rectangular, circular, elliptical, or diamond shape, or any combination thereof.

7. The vented honeycomb structure of claim 1, further comprising a pair of opposing skins arranged about the honeycomb cells so as to define a sandwich structure.

8. The vented honeycomb structure of claim 1, wherein at least one set of adjacent trusses of the plurality of trusses are bias-oriented at +45° in relation to one another.

9. The vented honeycomb structure of claim 1, wherein the honeycomb structure comprises a tapered or curved portion.

10. A vented honeycomb structure, comprising:
a series of honeycomb cells, each honeycomb cell of the series of honeycomb cells including a plurality of walls each of the plurality of walls comprising trusses arranged to form a series of openings defined through the walls so as to allow fluid flow between adjacent ones of the honeycomb cells, wherein the openings of the walls comprise a hexagonal, triangular, square, rectangular, circular, elliptical, or diamond shape, or any combination thereof, and wherein the walls and the openings of the walls of adjacent honeycomb cells are functionally graded such that compositional and/or structural properties of the honeycomb cells vary across a volume of the vented honeycomb structure; and
a pair of opposing skins arranged along opposite ends of the series of honeycomb cells so as to define a sandwich structure, wherein one or more of the pair of opposing skins allows fluid flow therethrough so as to provide venting to an exterior of the vented honeycomb structure.

11. The vented honeycomb structure according to claim 10, wherein one or more of the series of honeycomb cells is configured to allow for fuel storage and/or coolant flow.

12. The vented honeycomb structure of claim 10, wherein the truss walls are configured to provide an increase in strength as well as a reduction in density of the vented honeycomb structure.

13. A vented honeycomb structure, comprising:
a core comprising a plurality of adjacent honeycomb cells, the plurality of adjacent honeycomb cells comprising hexagonal, triangular, square, rectangular, and/or circular honeycomb cell shapes, or combinations thereof, and the plurality of adjacent honeycomb cells defining first and second apertures at corresponding first and second ends thereof,
wherein each honeycomb cell of the plurality of adjacent honeycomb cells further comprises a series of walls, each wall of the series of walls comprising a plurality of trusses having one or more cross-sectional shapes including hexagonal, triangular, square, rectangular, circular, elliptical, angular, I-beam, C-section, H-section, T-section, L-section, Z-section or hat-section shapes, or combinations thereof, the plurality of trusses are connected together and arranged to form a series of openings having hexagonal, triangular, square, rectangular, circular, or elliptical shapes, or combinations thereof, and
wherein the cross-sectional shapes of the plurality of trusses are arranged such that the series of walls are functionally graded to vary one or more compositional and/or structural properties of the vented honeycomb structure, and the shapes of the openings defined by the plurality of trusses are functionally graded such that one or more of the openings vary in shape between adjacent walls of the plurality of adjacent honeycomb cells; and
a pair of opposing skins arranged to cover the first and second apertures defined by the plurality of adjacent honeycomb cells at their first and second ends.

14. The vented honeycomb structure of claim 13, further comprising at least one additional honeycomb cell having at least one wall that is substantially solid.

15. The vented honeycomb structure of claim 13, wherein the series of walls are configured to provide an increase in strength as well as a reduction in density of the honeycomb structure.

16. The vented honeycomb structure of claim 13, wherein one or more of the series of walls comprise substantially solid walls.

17. The vented honeycomb structure of claim 13, wherein the plurality of trusses are at least one of solid, hollow, or porous.

18. The vented honeycomb structure of claim 13, wherein the plurality of trusses comprise a metal, a ceramic, a polymer, an elastomer, a glass, a paper, a composite, a semiconductor, or any combination thereof.

19. The vented honeycomb structure of claim 13, wherein at least one set of adjacent trusses of the plurality of trusses are bias-oriented at ±45° in relation to one another.

20. The vented honeycomb structure of claim 13, wherein the honeycomb structure comprises a tapered or curved portion.

21. The vented honeycomb structure of claim 13, wherein one or more of the plurality of adjacent honeycomb cells is configured to allow for fluid storage and/or fluid flow.

* * * * *